(12) United States Patent
Noh et al.

(10) Patent No.: US 9,008,959 B2
(45) Date of Patent: Apr. 14, 2015

(54) APPARATUS AND METHOD FOR INTER-VEHICLE COMMUNICATION

(71) Applicants: Hyundai Motor Company, Seoul (KR); Kia Motors Corporation, Seoul (KR); Korea University Research and Business Foundation, Seoul (KR)

(72) Inventors: Dong Gyu Noh, Gyeonggi-do (KR); Jong Rok Park, Seoul (KR); Su Lyun Sung, Gyeonggi-do (KR); Yong Tae Park, Gyeonggi-do (KR); Byung Jo Kim, Seoul (KR); Seung Nam Yang, Seoul (KR); Ji Hun Ha, Seoul (KR); Sung Heon Lim, Seoul (KR); Hyo Gon Kim, Seoul (KR)

(73) Assignees: Hyundai Motor Company, Seoul (KR); Kia Motors Corporation, Seoul (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 14/058,573

(22) Filed: Oct. 21, 2013

(65) Prior Publication Data

US 2014/0379250 A1    Dec. 25, 2014

(30) Foreign Application Priority Data

Jun. 25, 2013 (KR) ........................ 10-2013-0073245

(51) Int. Cl.
G08G 1/16 (2006.01)
(52) U.S. Cl.
CPC ..................................... *G08G 1/161* (2013.01)
(58) Field of Classification Search
CPC .... B60R 25/33; G01M 17/007; G01S 5/0027; G07C 5/008; G07C 5/0808; G07C 5/085; G07C 2205/02; G08G 1/20; G08G 1/127; G08G 1/161

USPC ......................... 701/31.5, 484, 408
See application file for complete search history.

(56) References Cited

U.S. PATENT DOCUMENTS 5,450,329 A * 9/1995 Tanner ..................... 701/467
7,593,999 B2 * 9/2009 Nathanson .................. 709/217

(Continued)

FOREIGN PATENT DOCUMENTS

EP    2288190 A1    2/2011
JP    2009276845 A    11/2009

(Continued)

OTHER PUBLICATIONS

Park, Yongtae "Application-Centric Control of Perdiodic Safety Messages Dissemination in IEEE WAVE System", Dept. of Computer and Radio Communications Engineering Graduate School, Korea University, Jan. 2012.

*Primary Examiner* — Mary Cheung
*Assistant Examiner* — Atul Trivedi
(74) *Attorney, Agent, or Firm* — Mintz Levin Cohn Ferris Glovsky and Popeo, P.C.; Peter F. Corless

(57) ABSTRACT

There are provided an apparatus and a method for inter-vehicle communication. The apparatus includes a communication unit configured to perform communication with another vehicle, a positioning unit configured to obtain positional information of a vehicle, and a controller configured to synchronize time instances of transmitting/receiving messages to/from the another vehicle using a signal from the positioning unit, to set communication conditions based on communication congestion with the another vehicle, and to perform transmitting/receiving messages to/from the another vehicle at the synchronized time instance according to the communication conditions.

10 Claims, 4 Drawing Sheets

(56) References Cited

U.S. PATENT DOCUMENTS

| | | | |
|---|---|---|---|
| 7,603,117 B2 * | 10/2009 | Karabinis | 455/427 |
| 7,653,394 B2 * | 1/2010 | McMillin | 455/444 |
| 7,783,287 B2 * | 8/2010 | Karabinis | 455/427 |
| 7,912,642 B2 * | 3/2011 | Zhao et al. | 701/484 |
| 8,744,750 B2 * | 6/2014 | Gupta et al. | 701/408 |
| 2005/0226201 A1 * | 10/2005 | McMillin | 370/348 |
| 2006/0198346 A1 | 9/2006 | Liu et al. | |
| 2008/0002573 A1 | 1/2008 | Mosko et al. | |
| 2008/0161989 A1 * | 7/2008 | Breed | 701/29 |
| 2009/0104903 A1 * | 4/2009 | Karabinis | 455/427 |
| 2009/0138196 A1 * | 5/2009 | Laberteaux | 701/213 |
| 2010/0049819 A1 * | 2/2010 | Hamada et al. | 709/207 |
| 2010/0260046 A1 | 10/2010 | Reumerman et al. | |
| 2010/0312432 A1 * | 12/2010 | Hamada et al. | 701/33 |
| 2011/0044172 A1 | 2/2011 | Yim et al. | |
| 2011/0128849 A1 | 6/2011 | Guo | |
| 2011/0205943 A1 | 8/2011 | Grimm et al. | |
| 2012/0129459 A1 | 5/2012 | Hsieh et al. | |

FOREIGN PATENT DOCUMENTS

| | | |
|---|---|---|
| JP | 2010-183178 A | 8/2010 |
| KR | 10-2011-0107908 | 10/2011 |

* cited by examiner

APPARATUS AND METHOD FOR INTER-VEHICLE COMMUNICATION

CROSS-REFERENCE TO RELATED APPLICATION

This application is based on and claims priority from Korean Patent Application No. 10-2013-0073245, filed on Jun. 25, 2013 in the Korean Intellectual Property Office, the disclosure of which is incorporated herein in its entirety by reference.

BACKGROUND

1. Technical Field

The present disclosure relates to an apparatus and a method for inter-vehicle communication, and more particularly, to an apparatus and a method for inter-vehicle communication which improve the communication reliability of inter-vehicle communication by setting the time instances of transmitting/receiving messages using epochs, and by adjusting the data rate or transmission power according to the communication state to transmit/receive messages at the set time instances of transmitting/receiving messages.

2. Description of the Related Art

In general, vehicle-to-vehicle communication refers to two-way communication performed between vehicles, by which the vehicles exchange information such as traffic conditions.

The vehicle-to-vehicle communication is applied to prevent accidents in a manner that vehicles exchange information such as traffic conditions so that collisions at the crossways are prevented, for example. In such cases, it is important to maintain the efficiency of the vehicle-to-vehicle communication.

For this reason, among other technologies for maintaining the efficiency of the vehicle-to-vehicle communication, a technology has been developed which, when the vehicle-to-vehicle communication becomes congested due to high vehicle density on a road, maintains the efficiency of the vehicle-to-vehicle communication by changing the frequency at which a vehicle transmits information.

However, such a technology has a problem in that the accuracy of the information on traffic conditions received from another vehicle is low, if channel losses of the transmitted information are severe when there are multi-path fading and noise due to obstacles or surrounding environments.

SUMMARY

Accordingly, the disclosed embodiments have been made to solve the above-mentioned problems occurring in the related art while advantages achieved by the related art are maintained intact.

One subject to be achieved by the present disclosure is to provide an apparatus and a method for inter-vehicle communication which set the time instances of transmitting/receiving messages using epochs, and adjust the data rate or transmission power according to the communication state to transmit/receive messages at the set time instances of transmitting/receiving messages.

In one aspect of the present disclosure, there is provided an inter-vehicle communication apparatus, including a communication unit configured to perform communication with another vehicle, a positioning unit configured to obtain positional information of a vehicle, and a controller configured to synchronize a time instance of transmitting/receiving a message to/from the another vehicle by a signal from the positioning unit, to set communication conditions based on communication congestion associated with the another vehicle, and to perform transmitting/receiving the message to/from the another vehicle at the synchronized time instance according to the communication conditions.

The controller may synchronize the time instances of transmitting/receiving messages using epochs. The controller may determine the communication congestion with the another vehicle by utilizing channel busy percentage (CBP) of communication environment with the another vehicle. The controller may set the communication conditions by increasing a data rate to a higher data rate if the communication congestion is above a threshold value, thereby reducing the communication congestion below the threshold value. The controller may set the communication conditions by reducing a transmission power if the communication congestion is not lowered below the threshold value even after the communication conditions has been set to the higher data rate, thereby reducing the communication congestion below the threshold value.

In another aspect of the present disclosure, there is provided a method for inter-vehicle communication, including synchronizing, by a controller, time instances of transmitting/receiving messages to/from another vehicle using a signal associated with a vehicle obtained from a positioning unit, determining communication congestion with the another vehicle, setting communication conditions with the another vehicle based on the communication congestion, and performing transmitting/receiving the message to/from the another vehicle at the synchronized time instance according to the communication conditions.

The synchronizing of the time instances may include synchronizing the time instances of transmitting/receiving messages using epochs. The determining of the communication congestion may include determining the communication congestion with the another vehicle by utilizing channel busy percentage (CBP) of communication environment with the another vehicle. The setting of the communication conditions may include setting the communication conditions to a data rate if the communication congestion is above a threshold value, thereby reducing the communication congestion below the threshold value, and setting the communication conditions to a transmission power if the communication congestion is not lowered below the threshold value even after the communication conditions has been set to a higher data rate, thereby reducing the communication congestion below the threshold value.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Hereinafter, exemplary embodiments of the present disclosure will be described in more detail with reference to the accompanying drawings. In describing embodiments, features that are well known in the art and are not directly related to the present disclosure will not be described wherever possible. This is not to obscure the gist of the disclosed embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term "controller" refers to a hardware device that includes a memory and a processor. The memory is configured to store program instructions and the processor is specifically configured to execute said program instructions to perform one or more processes which are described further below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
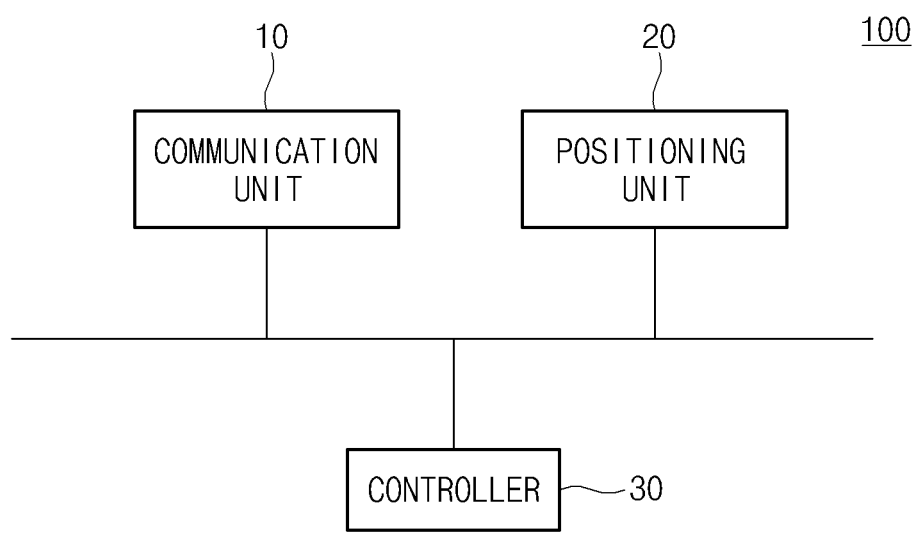
FIG. 1 is a block diagram showing major constituent elements of an apparatus for inter-vehicle communication according to an embodiment of the present disclosure.
Figure 2:
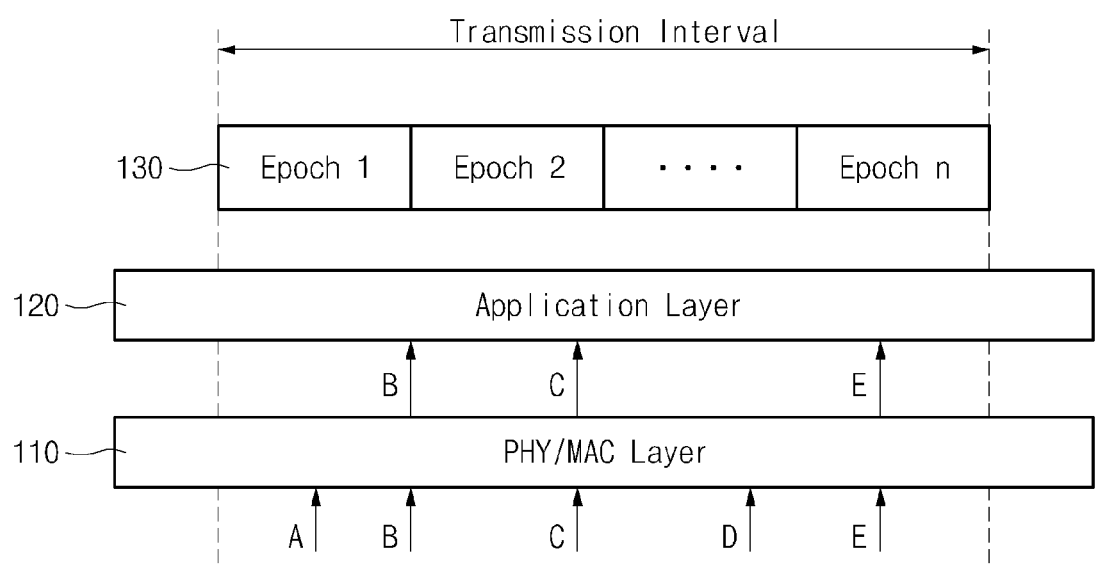
FIG. 2 is a diagram illustrating a concept of epoch according to an embodiment of the present disclosure.
Figure 3:
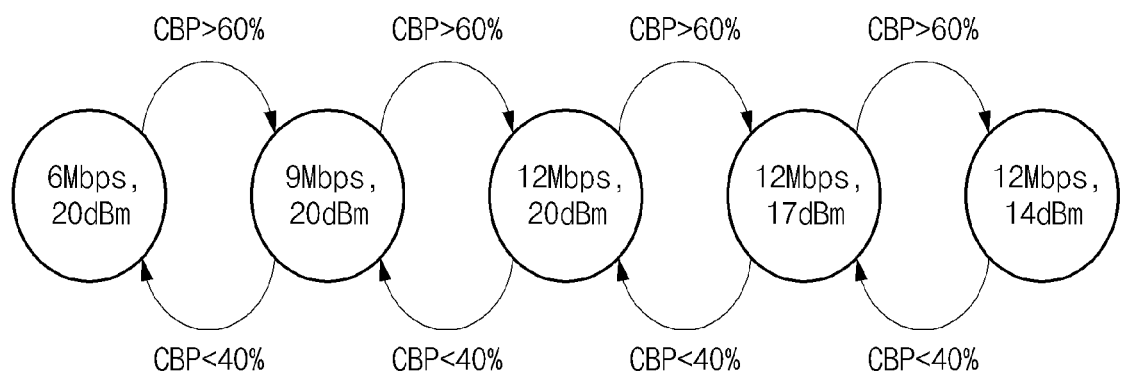
FIG. 3 is a diagram illustrating adjustment of the data rate or transmission power depending on communication states according to an embodiment of the present disclosure.

FIG. 1 is a block diagram showing major constituent elements of an apparatus for inter-vehicle communication according to an embodiment of the present disclosure. FIG. 2 is a diagram illustrating the concept of epochs according to an embodiment of the present disclosure. FIG. 3 is a diagram illustrating adjustment of the data rate or transmission power depending on communication states according to an embodiment of the present disclosure.

Referring to FIGS. 1 through 3, an apparatus for inter-vehicle communication according to the embodiment (hereinafter referred to as the apparatus 100) includes a communication unit 10, a positioning unit 20 and a controller 30.

The communication unit 10 performs communication between vehicles. To this end, the communication unit 10 may include a vehicle-to-vehicle (V2V) communication module, and transmits and receives messages to and from at least one adjacent vehicle via V2V communication. The positioning unit 20 performs data communication with GPS satellites using the global positioning system (GPS) to calculate coordinate values for the position of a vehicle, and acquires current position information of the vehicle based on the calculated coordinate values.

The controller 30 synchronizes the time instance of transmitting/receiving a message to/from another vehicle by a signal from the positioning unit 20, sets communication conditions depending on the communication congestion with the another vehicle, and performs transmitting/receiving of the message at the synchronized time instance according to the communication conditions. Specifically, the controller 30 synchronizes the time instances of transmitting/receiving messages using epochs synchronized using a signal from the position unit 20 (hereinafter referred to as a GPS signal).

Referring to FIG. 2, an epoch refers to a unit of time used for easily coordinating a time instance of transmitting/receiving a basic safety message (BSM, hereinafter referred to as the message) in an application layer 120 based on UTC time (Unix epoch time). Among frames A, B, C, D and E of a signal arriving at a PHY/MAC layer 110, frames A and D, which have failed to be received, are discarded in the PHY/MAC layer 110.

The frames B, C and E, rather than the frames A and D which have failed to be received, are transferred to the application layer 120 and are processed in an application corresponding to the application layer 120. The transmission interval used in the application layer 120 differs from application to application. When a message is transmitted, for example, the initial frequency is approximately 10 Hz, and the initial transmission interval is approximately 100 ms. As indicated by reference numeral 130, the transmission interval is divided into several epochs, each vehicle selects one of the epochs and synchronizes the time instance of transmitting/receiving a message, to transmit/receive the message.

The controller 30 may determine the transmitted epochs through the successfully received message, by which it may be determined how other vehicles are using the epochs. When the time instances of transmitting/receiving messages are synchronized, the controller 30 utilizes the channel busy percentage (CBP) of the corresponding communication environment with another vehicle to determine the communication congestion. If the communication is congested, the controller 30 sets the communication condition as shown in FIG. 3.

Specifically, if the communication congestion exceeds 60%, the controller 30 sets the communication condition by increasing the data rate from 6 Mbps to 12 Mbps. As the controller 30 increases the data rate, the time required for transmitting messages is reduced, so that the communication congestion is lowered to 60% or less. In addition, as the time required for transmitting messages reduces, the hidden terminal problem (HTP) is solved, thereby improving the efficiency of transmitting messages.

On the contrary, if the communication congestion is not lowered below 60%, even after the controller 30 has increased the data rate up to 12 Mbps, which is the highest data rate, then the controller 30 reduces the transmission power of transmitting messages from 20 dBm to 14 dBm so that the communication congestion is lowered to 60% or less. Moreover, if the communication congestion is below 40%, the controller determines that there are not many vehicles to perform communication and reduces the data rate. Here, if the controller 30 determines that data rate being used is the highest data rate, e.g., 12 Mbps, and the transmission power of transmitting messages is the lowest transmission power e.g., 14 dBm, the controller 30 may gradually recover the transmission power to the initial transmission power e.g., 20 dBm, so as to perform communication with another distant vehicle.

As described above, the controller 30 sets communication conditions by adjusting the data rate and transmission power in view of the communication congestion, and transmits messages to another vehicle in the selected epoch if the communication congestion is adjusted. As such, according to the disclosed embodiments, messages are transmitted in the epoch synchronized using the GPS signal, with the communication congestion adjusted by the communication conditions, so that the communication congestion between vehicles is solved, and thus the communication reliability can be improved. In addition, although the present disclosure illustrates that the data rate lies between 6 Mbps and 12 Mbps and the transmission power lies between 14 dBm and 20 dBm, the present disclosure is not limited thereto.

Figure 4:
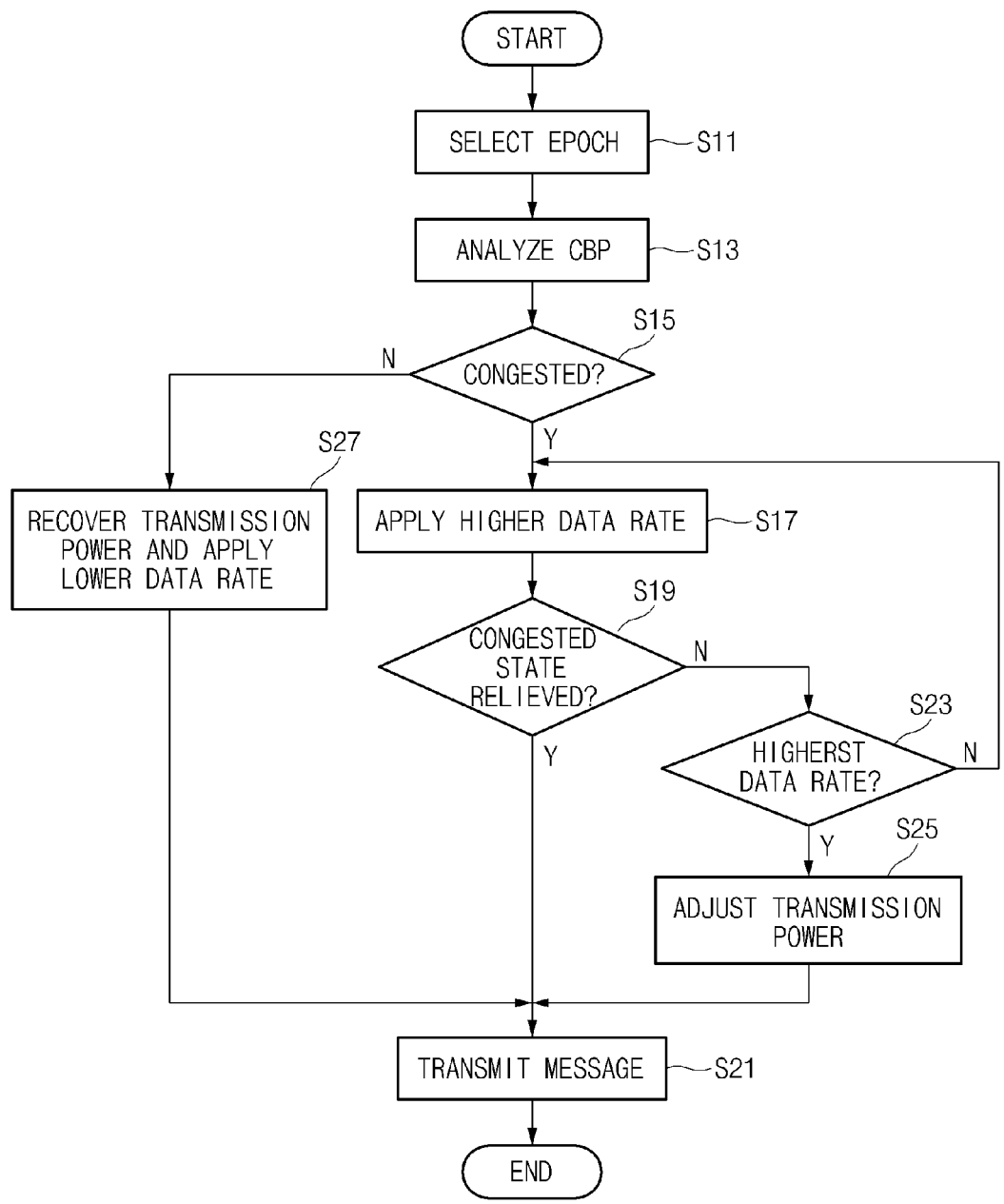
FIG. 4 is a flow chart illustrating a method for inter-vehicle communication according to an embodiment of the present disclosure.

FIG. 4 is a flow chart illustrating a method for inter-vehicle communication according to an embodiment of the present disclosure.

Referring to FIG. 4, in step S11, a controller 30 selects one epoch from among epochs which are units of time divided from transmission intervals for easily coordinating the time instances of transmitting/receiving messages in an application layer 120 based on UTC time. The controller 30 synchronizes the time instances of transmitting/receiving messages with reference to the selected epoch.

In step S13, the controller 30 utilizes the channel busy percentage (CBP) of the corresponding communication environment with another vehicle to determine the communication congestion. After the inquiry in step S15, it proceeds to step S17 if the communication congestion is above 60%, and proceeds to step S27 if the communication congestion is below 40%.

In step S27, since the communication congestion is below 40%, the controller 30 determines that there are not any other vehicles with which to perform communication to reduce the data rate, and recovers the transmission power for transmitting messages to the initial transmission power, so that communication with another distant vehicle may be performed. On the other hand, in step S17, the controller 30 sets the communication conditions by increasing the data rate to the next higher one. Then, it proceeds to step S19, in which the controller 30 determines whether the congestion state determined in step S15 is relieved.

If it is determined that the communication congestion state has been relieved in step S19, it proceeds to step S21 in which the controller 30 transmits a message to another vehicle in the epoch selected in step S11. On the contrary, if the communication congestion state has not been relieved even though the controller 30 has increased the data rate, it proceeds to step S23. In step S23, the controller 30 determines whether the data rate currently applied is the highest data rate.

If it is determined that the current data rate is the highest data rate, it proceeds to step S25 in which the controller 30 reduces the transmission power for transmitting messages. Here, the reducing of the transmission power for transmitting messages may cause the communication congestion to be lowered below 60%. On the contrary, if it is determined that the current data rate is not the highest data rate, it proceeds to step S17 in which the controller 30 repeats the steps described above.

As set forth above, according to the present disclosure, the reliability of communication between vehicles can be improved by setting the time instances of transmitting/receiving messages using epochs, and adjusting the data rate or transmission power according to the communication state to transmit/receive messages at the set time instances of transmitting/receiving messages.

Thus far, the apparatus and method for inter-vehicle communication according to the embodiments have been described. Exemplary embodiments have been described in the detailed description and the accompanying drawings. Herein, although specific terms have been used, these are merely used for the purpose of easily describing the disclosed embodiments, but not used for limiting the scope of the disclosed embodiments. It is obvious to those skilled in the art that various modifications may be made without departing from the scope of the present disclosure, other than the exemplary embodiments described herein.

What is claimed is:

1. An inter-vehicle communication apparatus, comprising:
   a communication unit configured to perform communication with another vehicle;
   a positioning unit configured to obtain positional information of a vehicle; and
   a controller configured to synchronize time instances of transmitting/receiving messages to/from the other vehicle using a signal from the positioning unit, to set communication conditions based on communication congestion with the other vehicle, to perform transmitting/receiving messages to/from the other vehicle at the synchronized time instance according to the communication conditions, and to determine the communication congestion with the other vehicle by utilizing channel busy percentage (CBP) of a corresponding communication environment with the other vehicle.

2. The apparatus according to claim 1, wherein the controller synchronizes the time instances of transmitting/receiving messages using epochs.

3. The apparatus according to claim 1, wherein the controller sets the communication conditions by increasing a data rate to a higher data rate when the communication congestion is above a threshold value.

4. The apparatus according to claim 3, wherein the controller sets the communication conditions by reducing a transmission power when the communication congestion is not lowered below the threshold value after the data rate has been set to the higher data rate.

5. A method for inter-vehicle communication, comprising:
   synchronizing, by a controller, time instances of transmitting/receiving messages to/from another vehicle using a signal associated with a vehicle obtained from a positioning unit;
   determining, by the controller, communication congestion with the other vehicle;
   setting, by the controller, communication conditions with the other vehicle based on the communication congestion;
   performing, by the controller, transmitting/receiving of the messages to/from the other vehicle at the synchronized time instances according to the communication conditions; and
   determining, by the controller, the communication congestion with the other vehicle by utilizing channel busy percentage (CBP) of a corresponding communication environment with the other vehicle.

6. The method according to claim 5, wherein the synchronizing of the time instances includes synchronizing the time instances of the transmitting/receiving of messages using epochs.

7. The method according to claim 5, wherein the setting of the communication conditions includes: setting the communication conditions by increasing a data rate to a higher data rate when the communication congestion is above a threshold value; and setting the communication conditions by reducing a transmission power when the communication congestion is not lowered below the threshold value after the data rate has been set to the higher data rate.

8. A non-transitory computer readable medium containing program instructions for inter-vehicle communication, comprising:

program instructions that synchronize time instances of transmitting/receiving messages to/from another vehicle using a signal associated with a vehicle obtained from a positioning unit;

program instructions that determine communication congestion with the other vehicle;

program instructions that set communication conditions with the other vehicle based on the communication congestion;

program instructions that perform transmitting/receiving of the messages to/from the other vehicle at the synchronized time instances according to the communication conditions; and program instructions that determine the communication congestion with the other vehicle by utilizing channel busy percentage (CBP) of a corresponding communication environment with the other vehicle.

9. The method according to claim 8, wherein the program instructions that synchronize the time instances include program instructions that synchronize the time instances of the transmitting/receiving of messages using epochs.

10. The method according to claim 8, wherein the program instructions that set the communication conditions include: program instructions that set the communication conditions by increasing a data rate to a higher data rate when the communication congestion is above a threshold value; and program instructions that set the communication conditions by reducing a transmission power when the communication congestion is not lowered below the threshold value after the data rate has been set to the higher data rate.

* * * * *